United States Patent [19]

Brändli et al.

[11] Patent Number: 4,763,910
[45] Date of Patent: Aug. 16, 1988

[54] RESILIENTLY MOUNTED, PIVOTABLE STEERING ROLL, ESPECIALLY FOR DRIVERLESS VEHICLES

[75] Inventors: Max Brändli; Hansueli Feldmann, both of Safnern, Switzerland

[73] Assignee: JD-Technologie AG, Zug, Switzerland

[21] Appl. No.: 895,941

[22] Filed: Aug. 13, 1986

[30] Foreign Application Priority Data

Aug. 23, 1985 [CH] Switzerland .................. 03634/85

[51] Int. Cl.⁴ .............................................. B60B 33/04
[52] U.S. Cl. ........................................... 280/29; 16/44; 180/168; 280/47.16; 280/79.1 R; 280/754
[58] Field of Search .................. 180/167, 168; 280/79.1 R, 79.1 A, 79.2, 79.3, 47.34, 47.22, 86, DIG. 14, 754, 47.16, 79, 754, 755; 16/44, 18 R, 35, 33

[56] References Cited

U.S. PATENT DOCUMENTS

| 2,707,795 | 5/1955 | Skupas ........................ 16/44 |
| 2,885,720 | 5/1959 | Seeberger ..................... 16/44 |
| 3,032,805 | 5/1962 | Skupas et al. ................ 16/44 |
| 3,174,176 | 3/1965 | Olson .......................... 16/44 |
| 4,462,138 | 7/1984 | Black .......................... 16/44 |
| 4,494,272 | 1/1985 | Morita ....................... 16/35 R |
| 4,515,235 | 5/1985 | Yamamoto et al. ........... 180/168 |

Primary Examiner—David M. Mitchell
Attorney, Agent, or Firm—Werner W. Kleeman

[57] ABSTRACT

This device prevents individual components of a load from being thrown off during halting of a conveying vehicle at a high rate of deceleration. A blocking device for the suspension of the caster which instantly assumes a front position as viewed in the direction of travel, prevents the vehicle from forwardly and downwardly dipping about the axle of the center-mounted drive wheels. The blocking device automatically adjusts itself corresponding to the direction of motion. A sliding stop vertically displaceably mounted on a pivotable part of a caster arrangement and a stop component fixedly mounted on the vehicle body cooperate to block the suspension of this front caster when the front caster experiences a predetermined degree of suspension displacement. At the caster instantly assuming the rear position, the stop component and the sliding stop are positioned at 180° to one another, thus precluding inadvertent engagement and permitting full suspension displacement. When changing direction of travel, both casters pivot automatically about a vertical axis, blocking the suspension of the front caster in the new direction of travel and permitting the rear caster to exploit its full suspension displacement range.

9 Claims, 3 Drawing Sheets

RESILIENTLY MOUNTED, PIVOTABLE STEERING ROLL, ESPECIALLY FOR DRIVERLESS VEHICLES

BACKGROUND OF THE INVENTION

The present invention broadly relates to steering roll or caster arrangements and, more specifically, pertains to a new and improved construction of a resiliently mounted, pivotable steering roll or caster arrangement, especially for driverless vehicles.

In its more particular aspects, the present invention pertains to a resiliently mounted, pivotable steering roll or caster arrangement for a vehicle, especially for a driverless guided conveying vehicle, for mounting at the front and rear of the vehicle as viewed in the travel direction of such vehicle. The vehicle thus contains a front caster, i.e. a caster instantly assuming a front position as viewed in the instant travel direction of the vehicle, and a rear caster, i.e. a caster instantly assuming a rear position as viewed in the instant travel direction of the vehicle.

In other words, the present invention relates to a vehicle having a first travel direction and a second travel direction relative to a travel surface. The vehicle comprises at least one steering roll or caster arrangement and support means for pivotally mounting the at least one caster relative to the vehicle. The support means comprises suspension means for resiliently suspending the at least one caster such that the at least one caster can perform motion in a direction relative to the vehicle body.

At least three wheels of a remotely controlled or driverlessly guided industrial conveying vehicle driven by two drive wheels located in the middle of the vehicle body must be continuously held in firm contact with the ground. This can be conventionally achieved by providing at least one caster which is resiliently connected with the vehicle body. For a vehicle with more than three wheels this can only be ensured if jolts arising when a vehicle is guided over an uneven track or travel surface can be absorbed while at least three of the wheels simultaneously remain in firm contact with the floor or travel surface and the drive wheels exert an approximately equal force on the floor or travel surface.

In order that such industrial conveying vehicles can be employed unproblematically and in an operationally reliable manner even on conventional industrial floors, the resiliently mounted casters require a suspension displacement which is as large as possible at the front and rear of the vehicle. Such suspension displacements are provided by resilient mountings or suspensions which usually comprise a plurality of stages in order that the casters even of unloaded vehicles continuously touch, i.e. remain in intimate contact with the floor and therefore reliably adjust to the direction of travel. During an emergency stop caused or initiated, for example, by a collision protection device detecting or colliding with an obstacle, the upper part of the vehicle containing the payload tends to continue to move in the direction of vehicle travel. Before the braked center-mounted drive wheels come to a halt, the vehicle pitches or dips forward around the center-mounted axle or axis of the drive wheels. The suspension of the front caster thus is fully loaded and the front part of the vehicle dips downwardly together with the load. If the load which usually comprises individual packages or cartons stacked in layers on pallets, has not been secured very carefully by means of straps, the front upper layer of the packages or cartons may fall off the vehicle.

In a driverless guided vehicle having pivotable free-running casters such as known, for example, from U.S. Pat. No. 4,515,235, granted May 7, 1985, a suspension is provided between the front and rear freely running casters and the vehicle body. The vehicle body is tiltable in the direction of travel around the two drive wheels located along the middle of the vehicle body. The pitching or tilting motion is taken up by the front and rear casters which are interconnected and pivotably connected to the vehicle body by a horizontal lever arm and by a horizontal pivot pin supported at the center of the vehicle body by two mounting plates. The front and rear casters are resiliently supported at the vehicle body by related vertically arranged coil springs. In a particular embodiment of this vehicle, the vehicle body is displaceably mounted in a vertical direction by a splined shaft guided by bearings in each of a front and a rear splined hub. In this same embodiment, the vehicle body is supported by respective spring or suspension means or units at the front and rear casters. Vertical movements brought about by unevenness or irregularities in the floor or travel surface are taken up at each end by a respective coil spring and by a respective additional rubber spring having a large spring constant for limiting the angular displacement of the vehicle body.

A disadvantage of this known vehicle is that although, when equipped with a fully symmetrical damping device comprising compression coil springs and rubber springs between the vehicle body and the casters, a pronounced forward dipping of the vehicle body is prevented, the vehicle is nevertheless unsuitable for operation on a standard industrial floor having relatively great irregularities, since the total suspension or shock absorbing action is inadequate.

SUMMARY OF THE INVENTION

Therefore, with the foregoing in mind, it is a primary object of the present invention to provide a new and improved construction of a resiliently mounted, pivotable steering roll or caster arrangement, especially for driverless vehicles which does not exhibit the aforementioned drawbacks and shortcomings of the prior art constructions.

Another and more specific object of the present invention aims at providing a new and improved construction of a resiliently mounted, pivotable steering roll or caster arrangement, especially for driverless vehicles of the previously mentioned type in which, in both possible directions of vehicle travel, a pronounced forward dipping or pitching, which results from halting at a high rate of deceleration, can be prevented while simultaneously adequate total suspension travel for faultless operation can be ensured on an industrial floor having large irregularities.

Yet a further significant object of the present invention aims at providing a new and improved construction of a resiliently mounted, pivotable steering roll or caster arrangement, especially for driverless vehicles of the character described, and which pivotable steering roll or caster arrangement is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the resiliently mounted, pivotable steering roll or caster arrangement of the present invention is manifested by the features that a stop device is provided and such stop device is effective only in one of two possible directions of travel.

In other words, the present invention is manifested by the features that the vehicle comprises limiting means structured to engage the suspension means for limiting the vehicle suspension motion when the vehicle travels in a first travel direction and to disengage therefrom when the vehicle travels in a second travel direction substantially opposite to the first travel direction.

The advantages achieved by the invention consist in that the suspension of the resiliently mounted front steering roll or caster as viewed in the direction of vehicle travel is blocked by the stop device during halting of the vehicle at a high rate of deceleration, while permitting the full spring or resilient or shock absorbing effect to be exploited by the resiliently mounted rear steering roll or caster. By means of the inventive stop device which comprises a stop plate mounted on a non-pivotable portion of the steering rolls or caster arrangement and sliding stop means mounted on a rotating or pivotable part of the steering roll or caster arrangement, the blocking of the steering roll or caster suspension is automatically switched in and out of effect as a function of the steering angle of the steering roll or caster, thus enabling the vehicle to remain fully symmetrical. Independent of the direction of travel, it can be constantly ensured that the vehicle does not greatly pitch or dip during halting at a high rate of deceleration and that no parts of the load will be thrown off.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
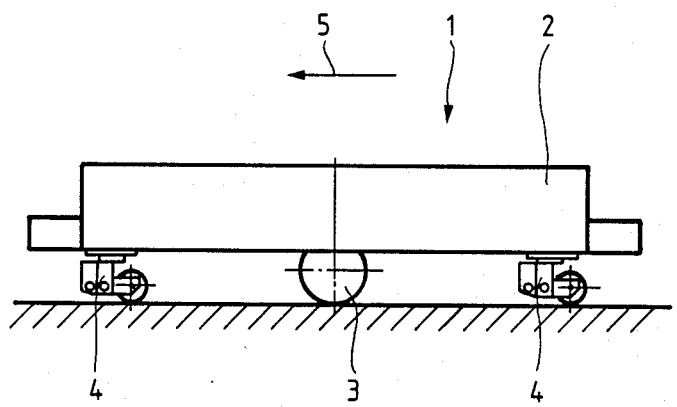
FIG. 1 schematically illustrates a side view of a guided driverless industrial conveying vehicle.
Figure 2:
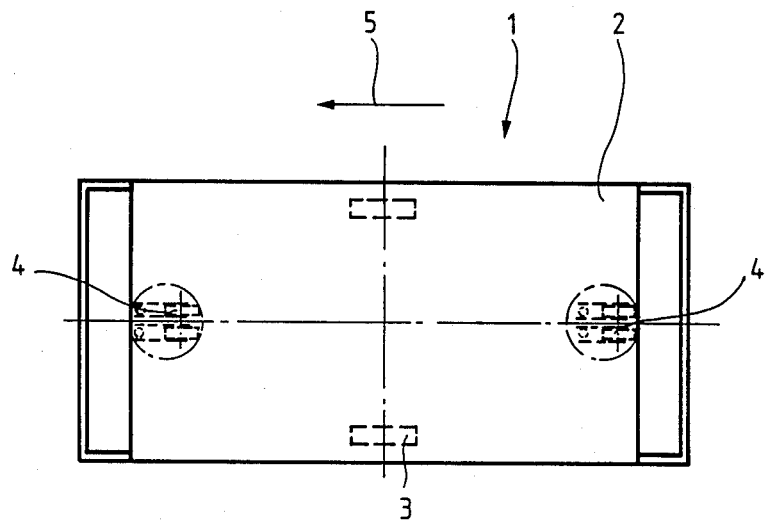
FIG. 2 schematically illustrates a plan view of the vehicle shown in FIG. 1.

Describing now the drawings, it is to be understood that to simplify the showing thereof only enough of the structure of the resiliently mounted, pivotable steering roll or caster arrangement, especially for driverless vehicles, has been illustrated therein as is needed to enable one skilled in the art to readily understand the underlying principles and concepts of this invention. Turning now specifically to FIGS. 1 and 2 of the drawings, there is illustrated therein by way of example and not limitation, a guided driverless industrial conveying vehicle 1. On a vehicle body 2, two drive wheels 3 are mounted in the central region. At least one steering roll or caster arrangement 4 is respectively mounted at each end, i.e. the front and rear end of the vehicle 1 as viewed in the travel direction. An arrow 5 indicates the direction of travel of the vehicle 1 upon a travel surface.

Figure 3:
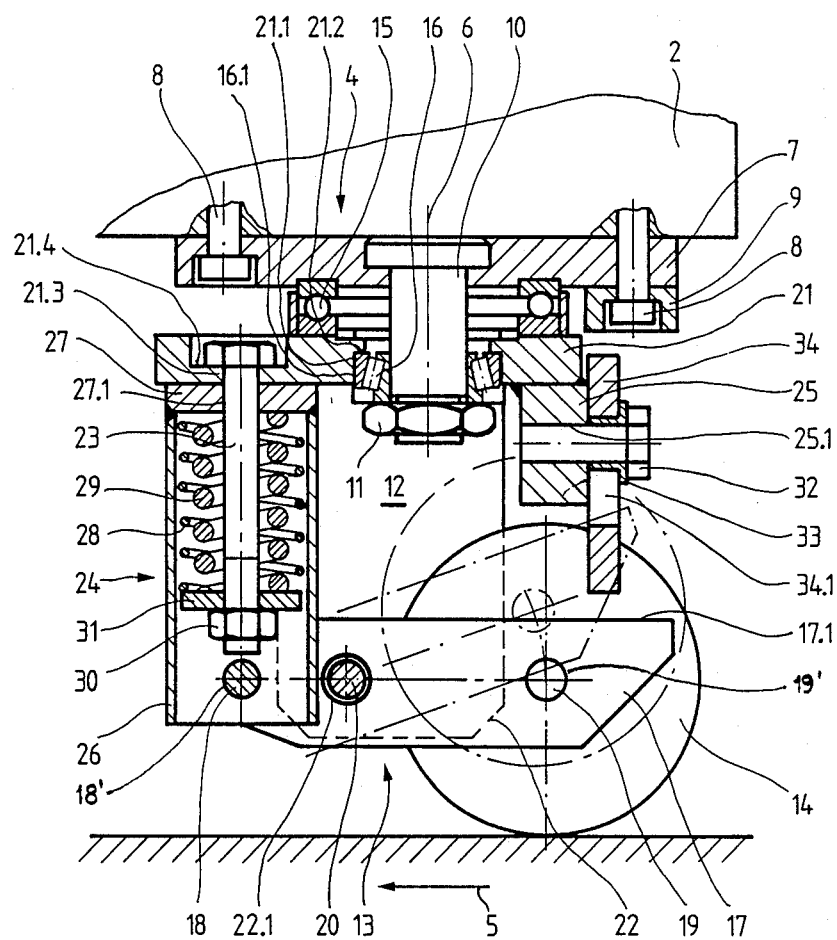
FIG. 3 schematically illustrates in side elevation and partial sectional view, an exemplary embodiment of the inventive pivotably and resiliently mounted steering roll or caster arrangement used in combination with the vehicle shown in FIG. 1.

FIG. 3 is an enlarged side and partially sectional view of one of the steering roll or caster arrangements 4. Each such steering roll or caster arrangement 4 comprises a fixed part or portion fixedly connected with the vehicle body 2 and a pivotable part or portion pivotable through 360° about a substantially vertical axis 6 and defining support means. The fixed part or portion comprises a fixing or mounting plate 7, fixing or mounting screws or bolts 8, a preferably screw-mounted stop plate or abutment member 9 of a stop device 9, 34, a pivot pin 10 and a nut 11. The pivotable part or portion comprises a caster yoke or support 12 having two rotatably mounted steering rolls or casters 14 each carried on a respective lever arm 13. The mounting or fixing plate 7 is fixed onto the vehicle body 2 by the fixing or mounting screws or bolts 8 and bears upon a thrust bearing 15 carried by the caster yoke or support 12. The caster yoke or support 12 is rotatably located or mounted at the pivot pin 10 by, for instance, a tapered roller bearing 16. The tapered roller bearing 16, the caster yoke or support 12, the thrust bearing 15 and the mounting or fixing plate 7 are held together on the pivot pin 10 by the nut 11. The caster yoke or support 12 comprises a horizontal support plate 21 and two pendant legs 22 located laterally on the horizontal support plate 21 and extending vertically downward. The horizontal support plate 21 is provided with a large annular groove 21.1 having a lower shoulder 21.2 for receiving an outer race 16.1 of the tapered roller bearing 16. Two small throughbores 21.3 with respective counter bores 21.4 are provided in the horizontal support plate 21 and receive respective clamping screws or bolts 23.

In the pendant legs 22, a continuous horizontal bore 22.1 is arranged for receiving a fulcrum shaft 20. The two lever arms 13 are pivotably positioned or mounted at this fulcrum shaft 20. Each lever arm 13 comprises two double-armed or rocking levers 17 each having three bores 18', 19' and 22.1 and an actuation nose 17.1. A central one of the three bores is aligned with the aforementioned continuous horizontal bore 22.1 and by means of this central bore, the rocking lever 17 bears upon the fulcrum shaft 20. In one of two end bores, namely the bore 19', there is mounted a rotary axle 19 of the associated steering roll or caster 14. In the other end bore, namely the bore 18' a pivot pin 18 is provided, serving as a pivot joint connection to a suspension means or unit 24.

The suspension means or unit 24 possesses a guide channel or tube 26 sealed at one end with a cover disc or plate 27. The suspension means or unit 24 also possesses two opposingly wound coil springs 28 and 29 mounted in the guide channel or tube 26. The two opposingly wound coil springs 28 and 29 have different spring constants. The downwardly open guide channel or tube 26 is mounted on the horizontal support plate 21 of the caster yoke or support 12 together with the coil springs 28 and 29 by a clamping screw 23, a spring retainer or collar 31 and a nut 30. The open end of the guide tube or channel 26 is connected with the pivot pin 18 provided at the rocking levers 17, i.e. the lever arm 13. A mounting block 25 is welded onto the support plate 21 of the caster yoke or support 12 on a side opposite the suspension means or unit 24.

A threaded hole 25.1 is provided in the mounting block 25. A screw or bolt 32 screwed into this threaded hole 25.1 serves to retain a sliding spacer sleeve or bushing 33. A sliding stop 34 of the stop device 9, 34 has a longitudinal slot 34.1 and thereby is slidingly guided in a substantially vertical direction at the sliding spacer sleeve or bushing 33.

Figure 4:
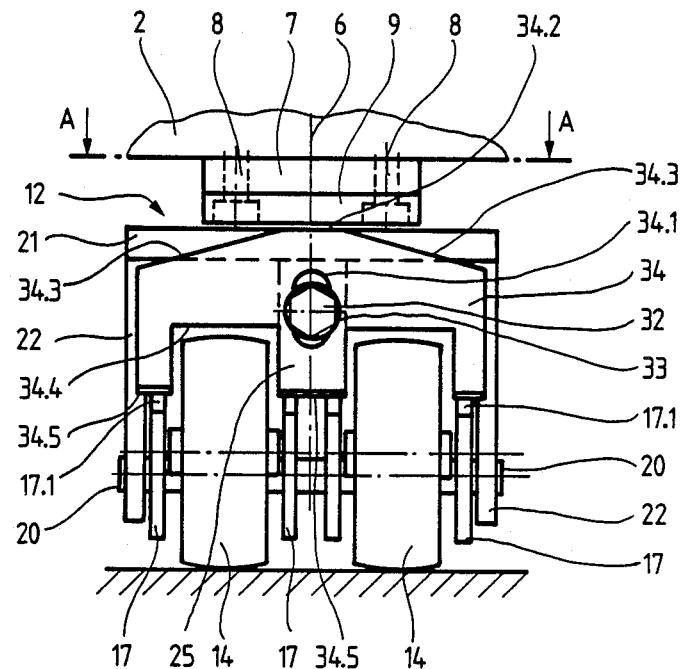
FIG. 4 schematically illustrates a rear view of a front steering roll or caster arrangement as viewed in the travel direction of the associated vehicle with individual components of a stop device in operative engagement with the suspension of the steering roll or caster.
Figure 5:
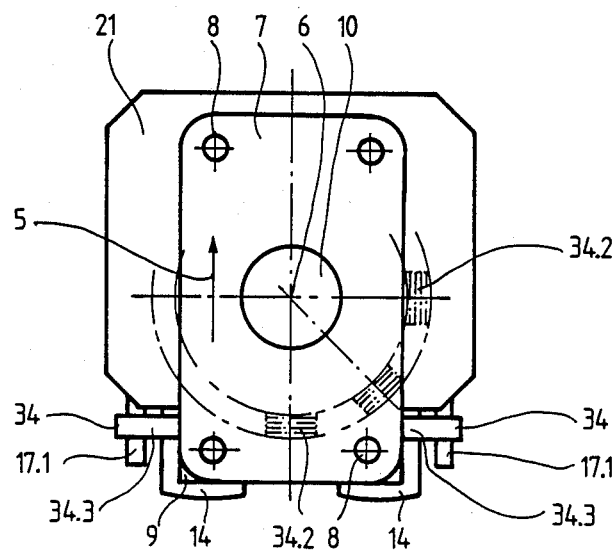
FIG. 5 schematically illustrates a plan view of the inventive steering roll or caster arrangement as viewed along the line A—A in FIG. 4.

In FIGS. 4 and 5, the sliding stop 34 can be seen in side and plan view, respectively. There is also visible the mutual interaction of the sliding stop 34, the actuation nose 17.1 of each double-armed rocking lever 17 and the stop plate or abutment member 9 which conjointly define limiting means for limiting the motion of the steering roll or caster 14. The sliding stop 34 is translatably mounted in a substantially vertical direction on the sliding spacer sleeve 33 held by the screw or bolt 32. The mounting plate 7 and the stop plate or member 9 are mounted on the vehicle body 2 by the screws or bolts 8. The caster yoke or support 12 which comprises the horizontal support plate 21 and the pendant legs 22 and is mounted on the pivot pin 10, is pivotable through 360° about the substantially vertical axis 6. The fulcrum shaft 20 is mounted in the pendant legs 22 of the caster yoke or support 12 and the double-armed rocking levers 17 of the lever arm 13 rotatably engage the fulcrum shaft 20. The sliding stop 34 is symmetrically configured relative to its vertical center axis and comprises an upper transverse stop surface 34.2 and two inclined stop surfaces 34.3 sloping away on each side. The sliding stop 34 also has two recesses 34.4 arranged to clear the steering rolls or casters 14 and further comprises one central and two outer lower contact surfaces 34.5. The direction of travel of the conveying vehicle 1 is indicated by the arrow 5 in FIG. 5.

The apparatus or device described above functions as follows:

The steering roll or caster arrangements 4 of the vehicle 1 are pivotable through 360° about the substantially vertical axis 6 and automatically orient or align themselves in the direction of vehicle travel. The suspension means or units 24 are arranged at the front of the pivotable part and the sliding stops 34 are arranged on the rear of the pivotable part as viewed in the travel direction of the vehicle 1. When the steering roll or caster arrangements 4 are loaded by surface irregularities or by the dynamics of starting or stopping, the vehicle body 2 moves upwards and downwards, causing the lever arms 13 to pivot about the centrally disposed fulcrum shaft 20. Hence, the suspension unit 24 and the sliding stop 34 are actuated. By way of example, during downward movement of the vehicle body 2, the lever arm 13 rocks or pivots and the actuation noise 17.1 of each double-armed lever 17 of the lever arm 13 is raised and bears against the lower contact surface 34.5 of the sliding stop 34 and forces the sliding stop 34 upwards.

During this loading and consequent suspension displacement of the steering roll or caster arrangement 4, the upper horizontal stop surface 34.2 of the sliding stop 34 contacts, during straight-line travel of the vehicle 1, the stop plate or abutment member 9 which is fixedly mounted at the mounting plate 7 of the vehicle body 2 close to the rear of the front steering roll or caster arrangement 4 as viewed in the travel direction of the vehicle 1. Consequently, the resilient suspension of the front steering roll or caster 14 is blocked in a downward direction. During straight-line vehicle travel, the steering roll or caster arrangement 4 assumes a first travel or angular orientation.

During curved motion or travel of the vehicle 1, the steering roll or caster arrangement 4 assumes a first range of travel or angular orientations extending on either side of the first travel or angular orientation. During such curved motion or travel of the vehicle 1, one of the inclined stop surfaces 34.3 of the sliding stop 34, in accordance with the instant angular orientation of the front steering roll or caster arrangement 4, will enter into operative engagement with the stop plate or abutment member 9, making possible an increased spring travel or suspension travel in the front steering roll or caster arrangement 4 as compared to straight travel. By means of these slanted or inclined stop surfaces 34.3, the transition from free suspension to blocked suspension is continuously adjusted in dependence upon the angular orientation of the front steering roll or caster arrangement 4 relative to the longitudinal axis of the vehicle 1. With respect to the rear steering roll or caster arrangement 4, the stop plate or abutment member 9 is arranged in front as viewed in the direction of vehicle travel. This stop plate or abutment member 9 is firmly screwed or otherwise suitably affixed to the vehicle body 2 together with the mounting plate 7. In respect of this rear steering roll or caster arrangement 4, the stop device 9, 34 for the suspension is thus inoperative and the full suspension travel of the steering roll or caster arrangement 4 can be utilized.

During an emergency stop of the vehicle 1, the front steering roll or caster 14 is subject to a suspension stroke only until the sliding stop 34 contact the stop plate or abutment member 9. The suspension thus is blocked before a portion of the load can be thrown off the vehicle 1. The vertical movement compensation is taken up by the unblocked rear steering roll or caster arrangement 4.

During a change in direction of travel of the vehicle 1, each one of the steering roll or caster arrangements 4 automatically turns or swivels through 180°, whereby the steering roll or caster arrangement 4 which now constitutes the front steering roll or caster arrangement 4, is operatively associated with an effective stop plate or abutment member 9 and the steering roll or caster arrangement 4 which now constitutes the rear steering roll or caster arrangement 4, is operatively disassociated from the related stop plate or abutment member 9 and enjoys full suspension or spring travel. Thus, this steering roll or caster arrangement 4, assumes a second range of travel or angular orientations in which the sliding stop 34 is remote from the stop plate or abutment member 9.

In order to provide equivalent equalization or compensation of surface unevenness or irregularities, the instant rear steering roll or caster arrangement 4 may be provided with twice as much suspension or spring travel so that in spite of a limited travel of the front suspension, the vehicle can travel over the same unevenness or irregularities as before.

Instead of the embodiment of a resilient and pivotable steering roll or caster arrangement having two adjacently mounted steering rolls or casters 14 as mentioned in the foregoing description of FIGS. 1 to 5 and as illustrated in such FIGS. 1 to 5, a steering roll or caster arrangement having only one steering roll or caster 14 would also be conceivable.

Instead of respective single steering roll or caster roll arrangements 4 at the front and at the rear of the vehicle 1, it would be likewise readily possible to provide two mutually independently pivotable and resiliently supported steering roll or caster arrangements 4 at each end of the vehicle 1. Each steering roll or caster arrangement 4 then could comprise either one steering roll or caster 14 or two mutually adjacent steering rolls or casters 14.

While there are shown and described present preferred embodiments of the invention, it is to be distinctly understood that the invention is not limited thereto, but may be otherwise variously embodied and practiced within the scope of the following claims. Accordingly,

What is claimed is:

1. A caster arrangement for resilient and pivotable mounting at the front and rear of a vehicle body of a vehicle, comprising:
   a caster;
   suspension means for resiliently supporting said caster at the vehicle body;
   said suspension means defining a predetermined substantially vertical suspension travel;
   a stop device associated with said suspension means and said vehicle body;
   said vehicle travelling in a first range of travel directions and in a second range of travel directions and which second range of travel directions is substantially opposite to said first range of travel directions; and
   said stop device being operatively associated with said suspension means and said vehicle body in order to limit said predetermined substantially vertical suspension travel of said suspension means under predetermined travelling conditions of said vehicle only in one of said first and second ranges of travel direction.

2. The caster arrangement as defined in claim 1, further including:
   a fixed part fixedly connected with the vehicle body;
   a pivotable part pivotably mounted at said fixed part;
   said suspension means being mounted at said pivotable part;
   said stop device containing a stop plate mounted at the fixed part;
   said stop plate being spaced from the pivotable part;
   said stop plate being located at the rear of said fixed part when the caster arrangement constitutes a front caster arrangement as viewed in the travel direction of the vehicle;
   said stop device further containing an actuatable sliding stop located at the rear of said pivotable part when the caster arrangement constitutes said front caster arrangement as viewed in the travel direction of the vehicle;
   a lever arm mounted at said suspension means and having a protruding actuation nose;
   said actuatable sliding stop of said front caster arrangement being arranged intermediate said protruding actuation nose of said lever arm and said stop plate mounted at said fixed part; and
   said actuatable sliding stop being substantially vertically movable under the action of said protruding actuation nose of said lever arm into contact with said stop plate in order to thereby reduce said predetermined suspension travel of said suspension means under said predetermined travelling conditions of said vehicle.

3. The caster arrangement as defined in claim 2, further including:
   a guide member mounted at said pivotable part for guiding said actuatable sliding stop during said substantially vertical movement thereof;
   said actuatable sliding stop possessing at least one guide slot slidingly guided by said guide member; and
   said guide member constituting at least one sliding spacer sleeve.

4. The caster arrangement as defined in claim 2, wherein:
   said actuatable sliding stop possesses a transverse upper stop surface adjoining two symmetrically arranged inclined stop surfaces for alternatively engaging said stop plate mounted at said fixed part in dependence upon the angular pivot orientation of said front caster arrangement in said one range of travel directions of said vehicle.

5. A vehicle having a first range of travel directions and an opposite second range of travel directions on a travel surface, comprising:
   a vehicle body;
   at least one caster supporting said vehicle body at each end thereof at the travel surface;
   support means for pivotably mounting said at least one caster relative to the vehicle body about a substantially vertical axis;
   said support means comprising suspension means for resiliently suspending said at least one caster such that said at least one caster can perform motion in a vertical direction relative to said vehicle body;
   limiting means operatively associated with said suspension means for automatically limiting said relative motion of said caster which constitutes a front caster when the vehicle travels in said first range of travel directions and operatively disassociated from said suspension means when said caster constitutes a rear caster and the vehicle travels in said second range of travel directions.

6. The vehicle as defined in claim 5, wherein:
   said at least one pivotably mounted caster assumes a first range of travel orientations corresponding to said first range of travel directions of the vehicle in which first range of travel directions said at least one pivotably mounted caster constitutes said front caster;
   said limiting means comprising:
   an abutment member mounted on the vehicle body;
   a sliding stop slidably mounted on said support means;
   said sliding stop being interposed in vertical alignment between said suspension means and said abutment member and limiting said relative motion associated with at least one front caster; and said abutment member and said sliding stop being located out of vertical alignment when said at least one caster assumes a second range of travel orientations corresponding to said second range of travel directions for providing substantially unlimited motion of said rear caster relative to said vehicle body through a predetermined suspension travel defined by said suspension means.

7. The vehicle as defined in claim 6, wherein:

said sliding stop comprises a substantially transverse stop surface and two sloping stop surfaces extending from opposite transverse sides of said substantially transverse stop surface;

said substantially transverse stop surface, in said vertical alignment of said abutment member and said sliding stop, defining a minimum spacing between said abutment member and said sliding stop; and each one of said two sloping stop surfaces defining a variable spacing between said abutment member and said sliding stop as a function of said travel orientation of said caster in said first range of travel orientations.

8. A caster arrangement for resilient and pivotable mounting at the front and rear of a vehicle having a vehicle body, comprising:

a caster;

suspension means for resiliently mounting said caster at the vehicle body;

said suspension means containing a pivotable part pivotable about a substantially vertical axis and assuming an angular position depending upon the travelling direction of said vehicle; and a stop device operatively associated with said suspension means and automatically limiting, in one travelling direction of said vehicle, upward displacements of said caster relative to said vehicle body and, in the opposite travelling direction of said vehicle, enabling upward displacements of said caster relative to said vehicle body.

9. The caster arrangement as defined in claim 8, further including:

a fixed part carried by the vehicle body;

said stop device contains a stop plate mounted at said fixed part;

said stop plate being located at a rear portion of said fixed part of said suspension means when the caster arrangement constitutes a front caster arrangement as viewed in the travelling direction of said vehicle;

said stop device possessing an actuatable sliding stop located at the rear portion of said pivotable part of said suspension means of said front caster arrangement as viewed in said travelling direction of said vehicle;

said suspension means further including a lever arm having a protruding actuation nose; and said actuatable sliding stop being substantially vertically upwardly movable by said protruding actuation nose of said lever arm.

* * * * *